United States Patent
Ross et al.

[15] 3,651,922
[45] Mar. 28, 1972

[54] LIVE ROLLER CONVEYOR FOR DISCRETE ARTICLES SUCH AS FRUIT

[72] Inventors: John M. Ross, Upland; Warren V. White, Ontario, both of Calif.

[73] Assignee: Sunkist Growers, Inc., Los Angeles, Calif.

[22] Filed: Oct. 10, 1969

[21] Appl. No.: 866,149

[52] U.S. Cl. ............................. 198/127, 15/3.17, 34/189, 34/236, 34/240
[51] Int. Cl. .................................................. B65g 13/02
[58] Field of Search .................... 15/3.17, 21.1; 198/25, 127, 198/105; 56/332, 340; 34/71, 236, 240, 189, 190

[56] References Cited

UNITED STATES PATENTS

| | | | |
|---|---|---|---|
| 1,919,275 | 7/1933 | Dunham | 34/203 X |
| 1,991,324 | 2/1935 | Keech | 34/236 X |
| 2,159,047 | 5/1939 | Paxton et al. | 34/236 X |
| 2,233,611 | 3/1941 | Hollenbeck | 15/3.17 |
| 2,576,891 | 11/1951 | Reynolds | 198/105 X |
| 3,071,866 | 1/1963 | Mangus | 34/95 X |
| 3,132,736 | 5/1964 | May et al. | 198/127 |
| 3,168,189 | 2/1965 | Luedtke | 198/128 |
| 3,180,481 | 4/1965 | Brause | 198/167 |
| 3,360,260 | 12/1967 | Rapparlie et al. | 198/167 X |

*Primary Examiner*—Frederick L. Matteson
*Assistant Examiner*—Harry B. Ramey
*Attorney*—Paul A. Weilein

[57] ABSTRACT

A live roller conveyor for discrete articles of varying size and shape, such as fruit, has two sets of laterally spaced resiliently compliant or spongy feed rollers which are arranged and staggered in uniform spaced relation to define an intervening essentially continuous article passage of generally serpentine configuration, the rollers being driven in rotary directions to feed the articles in one direction through the passage. The conveyor rollers may be used to lower articles from a high level to a low level or to raise the articles from a low level. The conveyor rollers may also be combined with heating means and blower means to function as a dryer for washed articles.

18 Claims, 13 Drawing Figures

PATENTED MAR 28 1972 3,651,922

INVENTORS,
JOHN M. ROSS,
WARREN V. WHITE
BY Paul A. Weilein
ATTORNEY

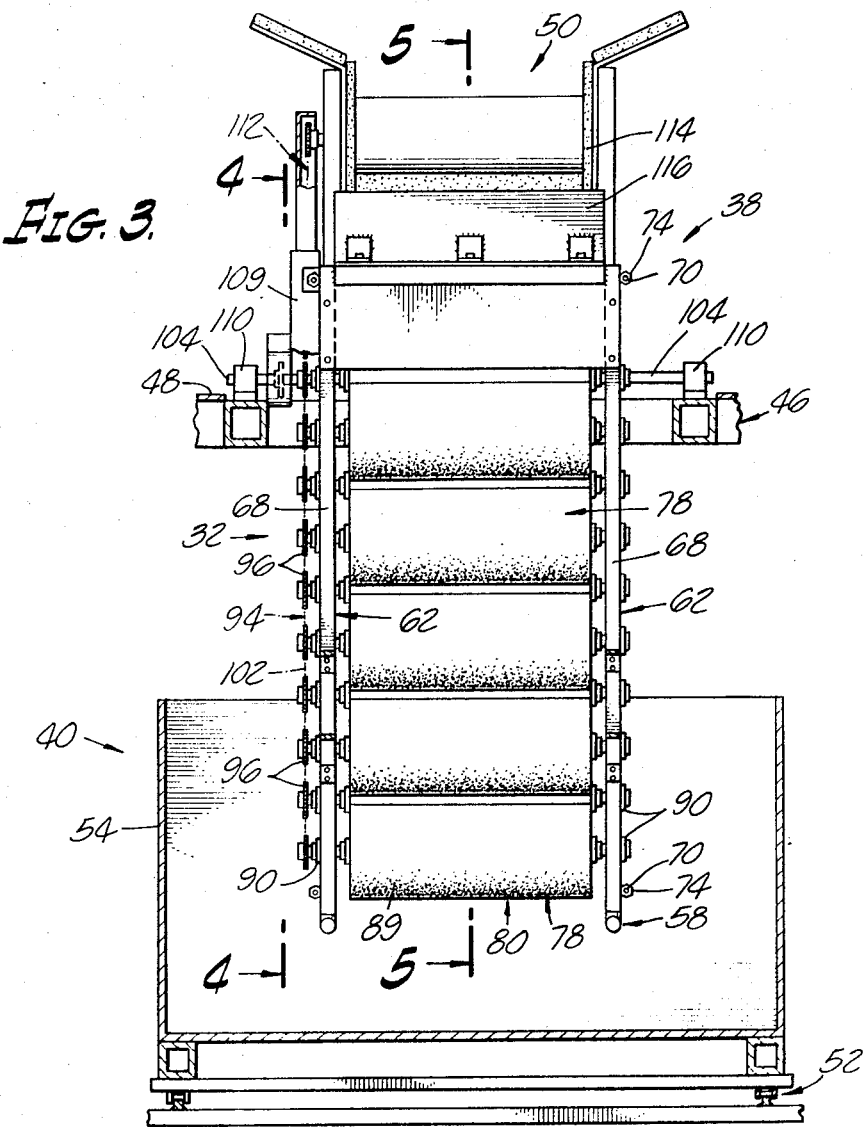
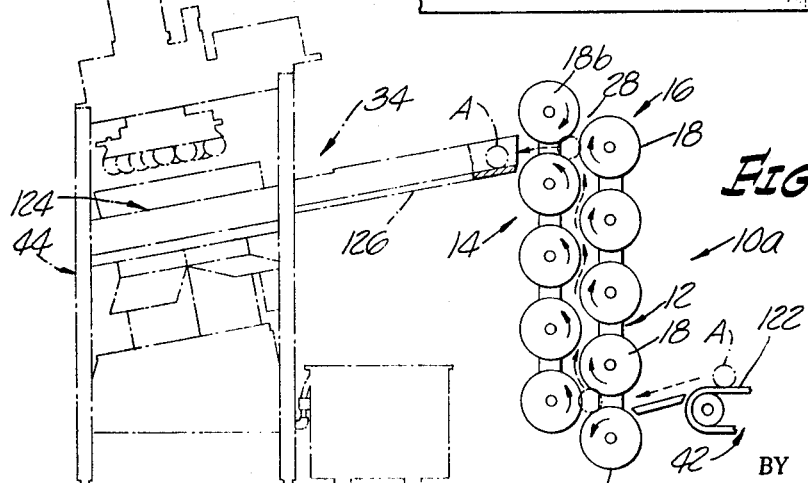

INVENTORS,
JOHN M. ROSS,
WARREN V. WHITE
BY
Paul A. Weilein
ATTORNEY

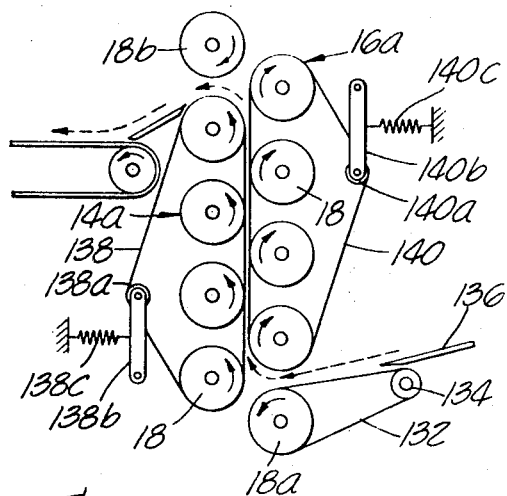
FIG. 9.
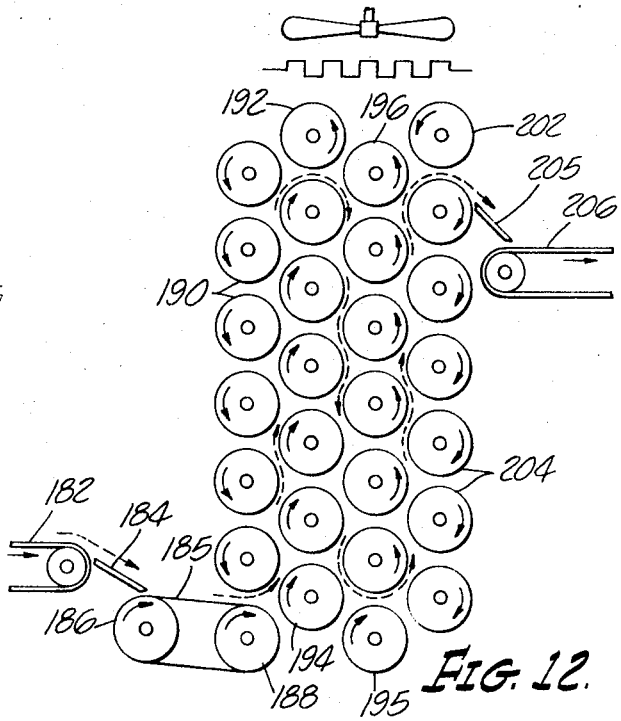
FIG. 12.
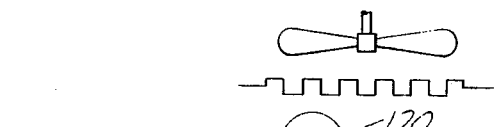
FIG. 11.
FIG. 10.
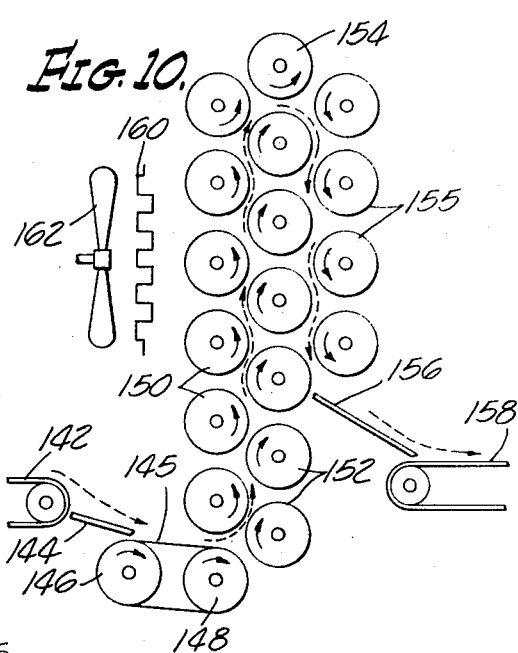
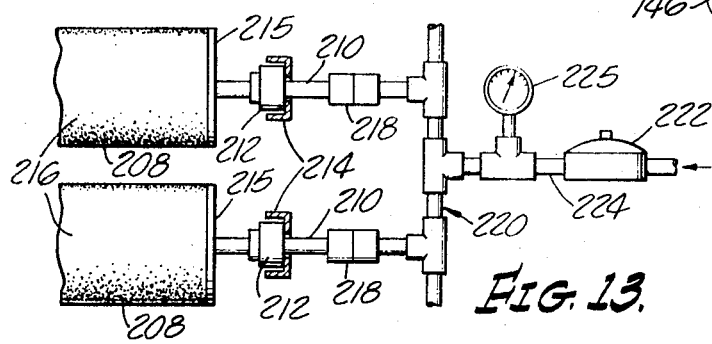
FIG. 13.
INVENTORS,
JOHN M. ROSS,
BY WARREN V. WHITE
Paul A. Weilein
ATTORNEY 3,651,922

LIVE ROLLER CONVEYOR FOR DISCRETE ARTICLES SUCH AS FRUIT

This is a streamlined continuation of application Ser. No. 644,835, filed June 9, 1967, now abandoned.

CROSS REFERENCE TO RELATED APPLICATIONS

Reference is made to copending application Serial No. 593,481, filed Nov. 10, 1966, now U.S. Pat. No. 3,437,174, and entitled Mobile Platform Construction disclosing a fruit harvesting platform having a gravity fruit conveyor of the baffled chute type.

BACKGROUND OF THE INVENTION

Prior art conveyors for discrete articles are of three general types, namely, powered endless conveyors, gravity conveyors, and single-set live roller conveyors. These prior art conveyors are useful for many purposes but are not capable of conveying fragile objects such as fruit in separate paths between substantially vertically spaced levels without damaging the fragile objects. There is a pressing need for a conveyor that has the capability of moving such fragile objects abruptly upwardly and downwardly in a gentle manner that avoids damage. The present invention meets this important need.

SUMMARY OF THE INVENTION

The invention provides a live roller conveyor characterized, in general terms, by two laterally spaced sets of staggered resiliently compliant or spongy feed rollers defining an intervening essentially continuous article passage of serpentine shape and arranged in successive triangular feed roll groups spaced along the passage, each including a pair of adjacent rollers of one roller set which are spaced a distance appreciably less than the average transverse dimension of the smallest articles to be conveyed and an opposing intervening roller of the other roller set which is uniformly spaced from each of said adjacent rollers a distance preferably slightly less than such average dimension to form with each latter roller a coacting roller pair. Means drives at least one roller of each roller pair in such a way that each roller pair is effective to feed the entering articles in a given direction along the passage from the preceding roller pair to the following roller pair and the several roller pairs are effective to continuously convey the articles in the given direction through the passage. An important feature of the invention resides in the resiliently compliant or spongy composition of the feed rollers which enables the rollers of the coacting roller pairs to yield locally into feeding engagement with articles of varying size and shape. Another important feature of the invention is concerned with certain novel infeed and outfeed arrangements for the conveyor, whereby the latter may be designed to receive and discharge the entering articles along direction lines which extend either longitudinally or laterally of the conveyor.

A more specific aspect of the invention is concerned with a fruit harvesting platform and a fruit packaging machine which utilize the conveyor for transferring fruit from one level to another. Thus, the harvesting platform has an upper fruit harvesting level and a lower fruit loading level and employs the conveyor to transfer the fruit as it is harvested without bruising or other damage, from the upper level to a fruit receiver at the lower level. The fruit packaging machine has a lower fruit infeed level and an upper fruit packaging level and employs the conveyor to transfer incoming fruit without bruising from the lower level to the upper level.

Other objects and advantages of the invention will be hereinafter described or will become apparent to those skilled in the art, and the novel features of the invention will defined in the appended claims.

BRIEF DESCRIPTION OF THE DRAWINGS

FIG. 3 is a section taken on the line 3—3 in FIG. 2;

FIG. 7 is a side elevation, on a reduced scale, of a fruit packaging machine embodying a modified live roller fruit transfer conveyor according to the invention;

FIG. 9 is a diagrammatic view of a conveyor for raising fruit from a low level to a high level, the conveyor being equipped with auxiliary belt means;

FIGS. 10, 11, and 12 are diagrammatic views of conveyors of the type taught by the invention in combination with heater means and blower means to function as dryers for washed articles such as fruit; and FIG. 13 is a somewhat diagrammatic fractional elevational view showing how inflated conveyor rollers may be employed with provision for varying the inflation pressure and maintaining a selected inflation pressure.

DESCRIPTION OF THE PREFERRED EMBODIMENT

Figure 2:
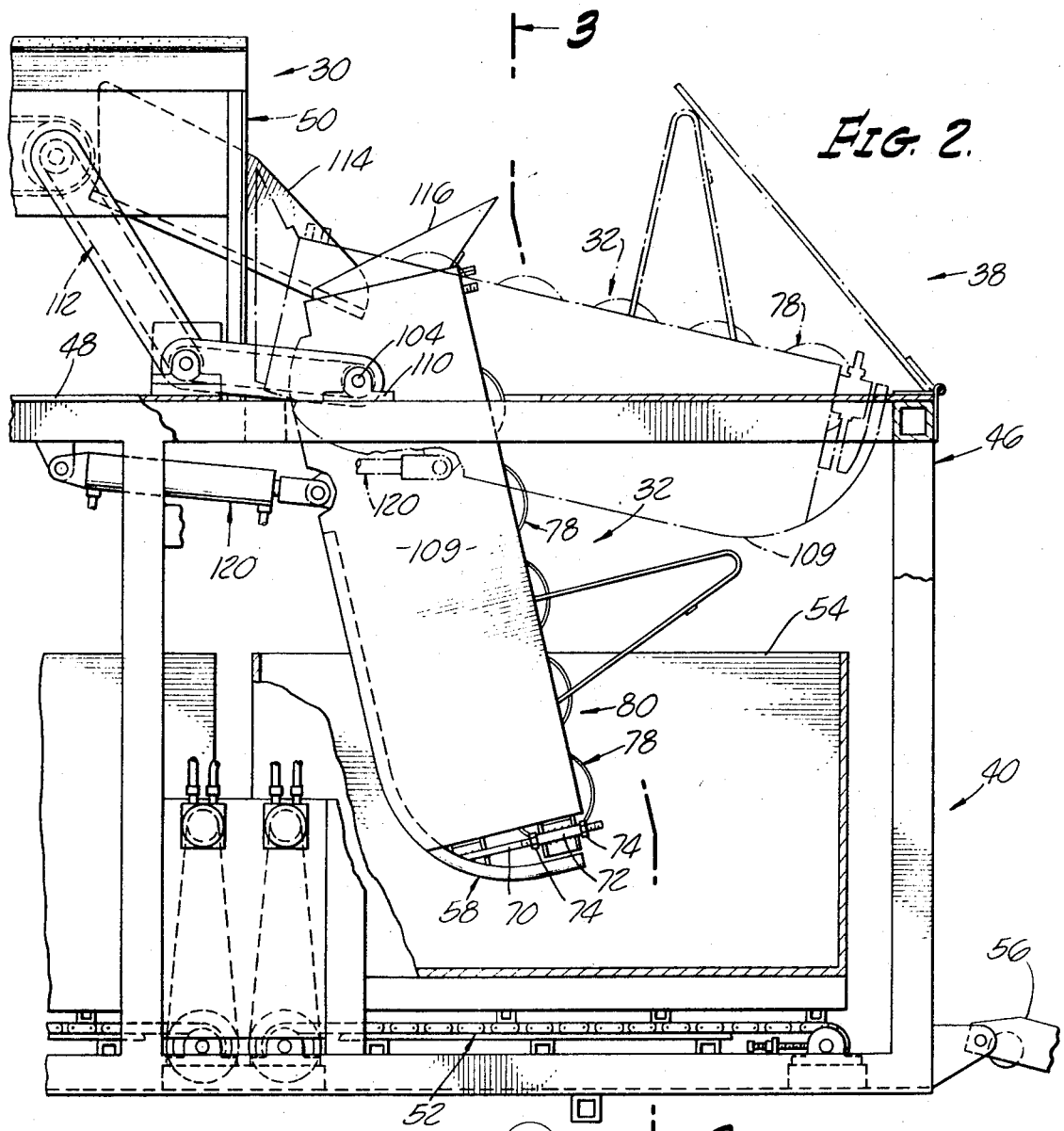
FIG. 2 is a side elevation, on an enlarged scale and partially broken away, of a fruit harvesting platform embodying a fruit transfer conveyor of the general type illustrated in FIG. 1.

As noted earlier, the invention pertains to a live roller conveyor for discrete articles, such as fruit. While the conveyor will be described in connection with conveying fruit, particularly citrus fruit, it is to be understood that the conveyor is capable of other uses. The invention provides a conveyor, represented in FIG. 1 by numeral 10, having a frame 12 mounting first and second sets 14 and 16 of uniformly spaced resiliently compliant feed rollers 18. The roller sets are spaced to define an intervening article passage 20. The rollers in the two roller sets are arranged in staggered relation along the passage 20 in such a way as to form a number of successive triangular roller groups spaced along the passage. Each triangular roller group includes two adjacent rollers of one roller set and an opposite intervening roller of the other roller set which is uniformly spaced from each of the two adjacent rollers to define with each latter roller a coacting roller pair. The several roller pairs are thus uniformly spaced along the passage 20 and each pair includes a feed roller 18 of the first roller set 14 and an opposing feed roller of the second roller set 16. The spacing between the opposing rollers of each roller pair, measured between the confronting surfaces of the opposing rollers in a plane defined by the axes of the two rollers, is generally uniform along the entire length of the passage and is slightly less than the transverse dimensions of the smallest articles to be transported, in this instance the diameter of the smallest fruit to be conveyed. The spacing between the successive rollers in each roller set 14, 16, is substantially less than this dimension or diameter. Coupled to the several feed rollers 18 are suitable means for driving the rollers in unison in such manner that the several rollers of each roller set (except for certain end rollers in modified conveyors to be described presently) turn in the same direction, and the rollers of the two roller sets turn in opposite directions.

During operation of the conveyor 10, the articles A to be conveyed enter the conveyor at its infeed end 26. As each article arrives at the infeed end, it is frictionally engaged by and drawn between the resiliently compliant surfaces of the first coacting pair of opposing feed rollers 18. These rollers yield to accommodate the entering article as the latter travels between the rollers. As each article emerges from the first roller pair, it is frictionally engaged by and thereby drawn between the second pair of feed rollers 18. The second roller pair, like the first roller pair, yields to accommodate movement of the article between the rollers. This action is repeated at each succeeding roller pair along the article passage 20. Thus, each pair of coacting feed rollers 18 is effective to transport the entering articles from the preceding roller pair to the following roller pair, in such a way that the articles undergo movement through the generally serpentine article passage 20 from its infeed end 26 to its outfeed end 28.

According to an important feature of the invention, the conveyor feed rollers 18 are composed of a relatively spongy material, such as foam rubber or suitable foamed plastic, which is capable of yielding locally to accommodate articles of various sizes and shapes. A foamed structure with closed cells is preferred for rapid resilient recovery from deformation. These spongy rollers are further particularly desirable in a conveyor for transporting fruit, since such rollers do not bruise or otherwise damage the fruit.

A further feature of the invention is concerned with certain unique infeed and outfeed arrangements of the present article conveyor. Thus, the infeed end of the conveyor may be designed to receive the articles to be conveyed along a path extending either longitudinally or laterally of the conveyor. Similarly, the outfeed end of the conveyor may be designed to discharge the articles either longitudinally or laterally of the conveyor.

Figures 1, 8:
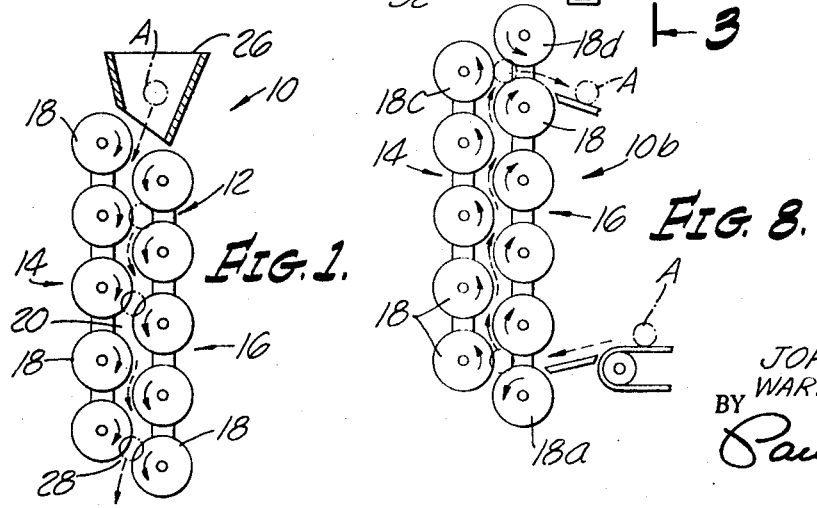
FIG. 1 diagrammatically illustrates a live roller article conveyor according to the invention.
FIG. 8 diagrammatically illustrates a further modified conveyor according to the invention.

The conveyor 10 illustrated in FIG. 1 has a longitudinal infeed and outfeed arrangement. In this case, in each of the two roller sets 14 and 16 all of the feed rollers 18 are driven in the same direction of rotation.

FIGS. 7 and 8 illustrate modified conveyors 10a and 10b, respectively, with lateral infeed and outfeed arrangements. Such lateral infeed is accomplished by utilizing modified conveyor drive means for driving certain end rollers of the conveyors (i.e., roller 18a in FIG. 7 and roller 18c in FIG. 8) in directions opposite to the directions of rotation of the other feed rollers 18 in the respective roller sets 14, 16.

In the lateral infeed arrangement of FIG. 7, for example, the incoming articles A are delivered to the conveyor infeed end along a lateral direction line of movement passing between the end roller 18d and its adjacent roller 18 in such a way that the articles are fed between these rollers into the article passage 20. The articles are then conveyed along the passage to the conveyor outfeed end 28. At this outfeed end, the articles travel around one adjacent conveyor end roller 18 and are thus discharged laterally from the conveyor. Lateral infeed and outfeed of the articles A is accomplished in a similar manner in the modified conveyor 10b of FIG. 8. The conveyors 10a, 10b differ in that the article infeed and outfeed motions occur through opposite sides of the conveyor 10a and through the same side of the conveyor 10b.

Referring now in greater detail to the drawings, FIGS. 2–6 illustrate a fruit harvesting platform 30 embodying a live roller fruit conveyor 32 according to the invention, and FIG. 7 illustrates a fruit packaging machine 34 embodying the fruit conveyor 10a of the invention. As will appear from the ensuing description, the harvesting platform 30 utilizes the conveyor 32 to convey or transfer harvested fruit without bruising from an upper harvesting level 38 to a lower loading level 40 of the platform. The packaging machine 34 utilizes the conveyor 10a to convey or transfer incoming fruit without bruising from a lower infeed level 42 to an upper packaging level 44. At this point, attention is directed to the fact that the present invention is concerned primarily with the conveyors per se embodied respectively in the harvesting platform and the packaging machine. Accordingly, the harvesting platform and the packaging machine will be described only in sufficient detail to afford a full and complete understanding of the present conveyor and its operation in conjunction therewith.

Referring first to FIGS. 2–6, the harvesting platform 30 is of the type disclosed in copending application Ser. No. 644,914, filed June 9, 1967, now U.S. Pat. No. 3,512,609, and entitled Tree Fruit Harvesting Platform, and will be seen to comprise a frame 46 supported on wheels (not shown) for movement along a row of trees (not shown) containing fruit to be harvested. At its upper harvesting level 38, the platform has deck means 48 for supporting a crew of pickers who pick fruit by hand from the trees and place the fruit on a conveyor 50 at the upper harvesting level. The lower loading level 40 of the platform includes conveyor means 52 for supporting a fruit receiver 54, such as a bin, and moving the latter along the platform to a bin discharge ramp 56 at the rear end of the platform. The present article conveyor 32 of the harvesting platform, hereinafter referred to as the transfer conveyor, extends between the upper harvesting level 38 and the lower loading level 40 and serves to convey or transfer harvested fruit from the upper infeed conveyor 50 to the lower receiving bin 54 without bruising or other damage.

The illustrated transfer conveyor 32 has a frame structure 58 including a normally front main frame 60 and a normally rear subframe 62. The main frame 60 has a pair of spaced parallel side frame members 64 rigidly joined by suitable cross frame members. The particular transfer conveyor shown has side reinforcing bars 66 rigidly joined to and projecting forwardly from the normally front side of the main frame 60. The lower ends of these bars curve forwardly below the lower ends of the main frame and subframe 62. Subframe 62 includes a pair of spaced parallel side frame members 68 rigidly joined by suitable cross frame members. Frame members 68 overlie, are substantially coextensive with, and have substantially the same spacing as the main frame side members 64.

The subframe 62 is adjustably supported on the main frame 60 by a number of adjusting screws 70 which extend between the side members 64, 68 of the frames. These screws are welded at one end to the main frame side members 64. The opposite ends of the screws extend slidably through bearing sleeves 72 welded to the subframe side members 68. Threaded on each screw, at opposite ends of the corresponding bearing sleeve, are nuts 74. It is now evident, therefore, that the spacing between the main frame 60 and subframe 62 may be adjusted by threading the nuts 74 along their respective screws 70.

The main frame 60 supports a first set 76 of feed rollers 78. The subframe 62 supports a second set 80 of feed rollers 78. In the transfer conveyor under consideration, the several feed rollers are essentially identical and have substantially equal diameters in their normal unstressed condition.

Figure 6:
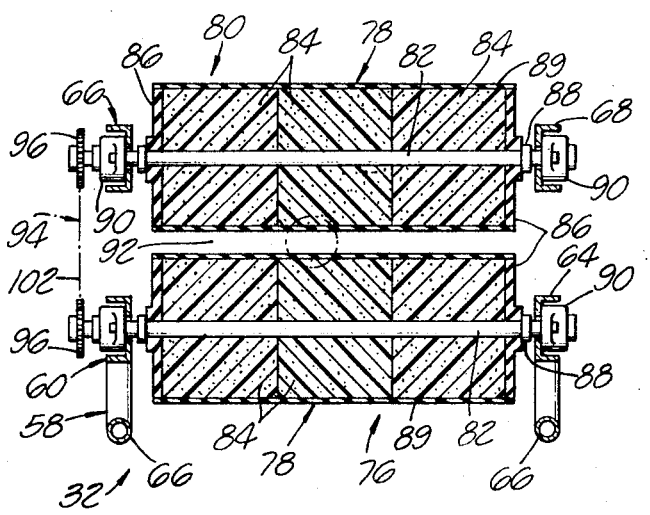
FIG. 6 is a section taken on the line 6—6 in FIG. 5.

Referring to FIG. 6, it will be seen that each feed roller 78 has a central shaft 82 on which are coaxially mounted a number of resiliently compliant cylindrical cores or discs 84. These discs are composed of relatively spongy material, such as foamed rubber or suitable plastic, and are disposed in end-to-end relation to form a main body of the roller. For this reason, the several cores or discs of each roller will be hereinafter referred to as a roller body 84.

Mounted on each roller shaft 82, in seating contact with the opposite ends, respectively, of the roller body 84, are circular end plates 86. These end plates have substantially the same outside diameter as the roller body in its normal unstressed condition and are axially positioned by outboard collars 88 on the roller shaft. The ends of the roller shaft extend a distance beyond the end plates, as shown. Surrounding the roller body 84 is a thin, pliable wear sleeve 89 of plastic or other suitable wear resistant material having an effective coefficient of friction with respect to the fruit being conveyed. This sleeve may be fixed against axial movement along the roller in any convenient way.

The several feed roller 78 of the roller set 76 are disposed between the side members 64 of the main conveyor frame 60 with the roller axes located in a common plane containing the longitudinal center lines of the side members. Similarly, the several feed rollers of the roller set 80 are disposed between the side members 68 of the subframe 62 with the roller axes located in a common plane containing the longitudinal center lines of the subframe side members. Attached to the outboard ends of the side frame members 64, 68 are bearings 90 (FIG. 6) which rotatably support the shafts 82 of the respective feed rollers 78. As shown best in FIGS. 3 and 4, the feed rollers of each roller set 76, 80 are uniformly spaced along their respective frames. Also, the spacing between successive rollers of one set is substantially equal to the spacing between the successive rollers of the other set. In accordance with a feature of the invention referred to earlier, the rollers of the roller sets 76 are offset or staggered lengthwise of the conveyor relative to the rollers of the other roller set 80. The staggered feed roller arrangement is such that each roller of each roller set is centered, lengthwise of the conveyor, between and is generally uniformly spaced from two adjacent rollers of the other roller set to form with each latter roller a coacting pair 91 of opposed rollers. The conveyor passage 92 defined between the roller sets 76, 80 thus has a generally sinusoidal or serpentine configuration, as shown, although the overall passage, and the conveyor, are generally linear.

The several feed rollers 78 of the transfer conveyor 32 are driven in rotation in unison by drive means 94. The drive means 94 includes driven sprockets 96 fixed to corresponding ends of the feed roller shafts 82, a drive sprocket 98, an idler sprocket 100, and a sprocket chain 102 trained about the sprockets. The drive sprocket 98 is fixed to a shaft 104 which is rotatably supported in adjustable bearings 106 (only one shown) fixed to opposite sides of the upper end of the main conveyor frame 60. Shaft 104 extends beyond opposite sides of the main frame, as shown. The idler sprocket 100 is carried on a bracket 108 adjustably mounted on the lower end of the main frame.

Figure 4:
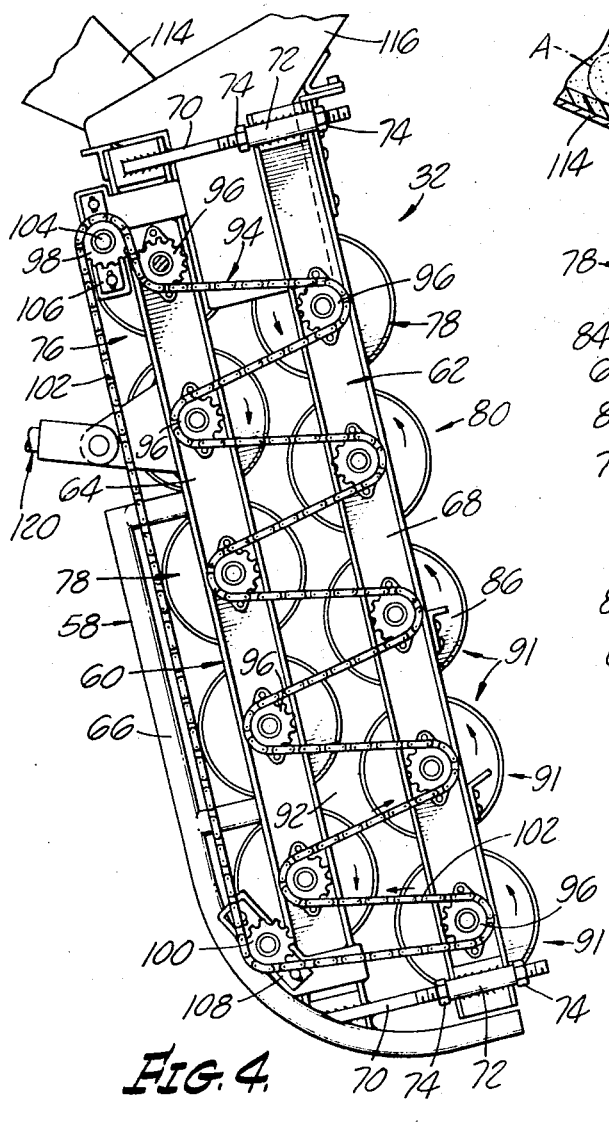
FIG. 4 is a section taken on the line 4—4 in FIG. 3.

Referring particularly to FIG. 4, it will be seen that the sprocket chain 102 is trained about the several sprockets 96, 98, 100 in such a way that the chain extends from the drive sprocket 98, around the upperside of the upper driven sprocket 96 on the main frame 60, then across the upper side and around the upper driven sprocket 96 on the subframe 62, then across the top and around the second driven sprocket 96 on the main frame, and so on around the driven sprockets on the main frame and subframe in alternate sequence, as shown. The chain emerges from the underside of the bottom driven sprocket 96 on the subframe 62, passes around the idler sprocket 100, and finally extends upwardly back to and around the drive sprocket 98.

It is now evident that endwise movement of the sprocket chain 102, by rotation of the drive sprocket 98, is effective to drive the feed rollers 78 in unison in such a way that the several rollers in each roller set 76, 80 turn in the same direction and the rollers of the two roller sets turn in opposite directions. In the particular transfer conveyor 32 under consideration, the sprocket chain is driven in a direction which causes clockwise rotation of the rollers mounted on the main frame 60 and counterclockwise rotation of the rollers mounted on the subframe 62, as the conveyor is viewed in FIGS. 3 and 4. The sides of the conveyor are preferably closed by side walls 109 (FIG. 3) which are rigidly attached, in any convenient way, to opposite sides of the main frame 60 and frame bars 66 and extend outwardly across opposite sides of the subframe.

Referring now to FIGS. 2 and 3, it will be observed that the outboard ends of the upper drive sprocket shaft 104 are rotatably supported in bearings 110 attached to the harvester platform frame 46 at the upper harvesting level 38 of the platform 30, and directly to the rear of the conveyor 50 at the upper level. The transfer conveyor extends downwardly from this upper level to the lower loading level 40 of the harvesting platform. In the ensuing description, the upper end of the transfer conveyor is referred to as its infeed end and the lower end of the transfer conveyor is referred to as its outfeed end. The transfer conveyor drive shaft 104 and the upper conveyor 50 are driven through a chain drive 112.

As noted earlier, the present transfer conveyor 32 is utilized to convey or transfer harvested fruit from the infeed conveyor 50 to a receiving bin 54 at the lower loading level 40 of the fruit harvesting platform 30. To this end, the upper infeed end of the transfer conveyor is disposed to receive fruit from the upper conveyor, and the lower outfeed end of the transfer conveyor is normally positioned within a receiving bin to discharge fruit into the bin. Movement of fruit from the upper conveyor 50 to the upper infeed end of the transfer conveyor 32 is aided by an inclined outfeed chute 114 at the rear outfeed end of the upper conveyor and by a flared infeed guide 116 at the upper infeed end of the transfer conveyor. This infeed guide 116 may have a cushion 118 (FIG. 5) opposite the lower end of the outfeed chute 114 against which the fruit rolling down the chute may impact, without bruising, during operation of the harvesting platform. Connected between the frame 46 of the harvesting platform 30 and the main frame 60 of the transfer conveyor 32 are elevating means 120 for raising and lowering the lower end of the transfer conveyor with a swinging motion about its upper supporting shaft 104, for the reasons hereinafter explained.

Figure 5:
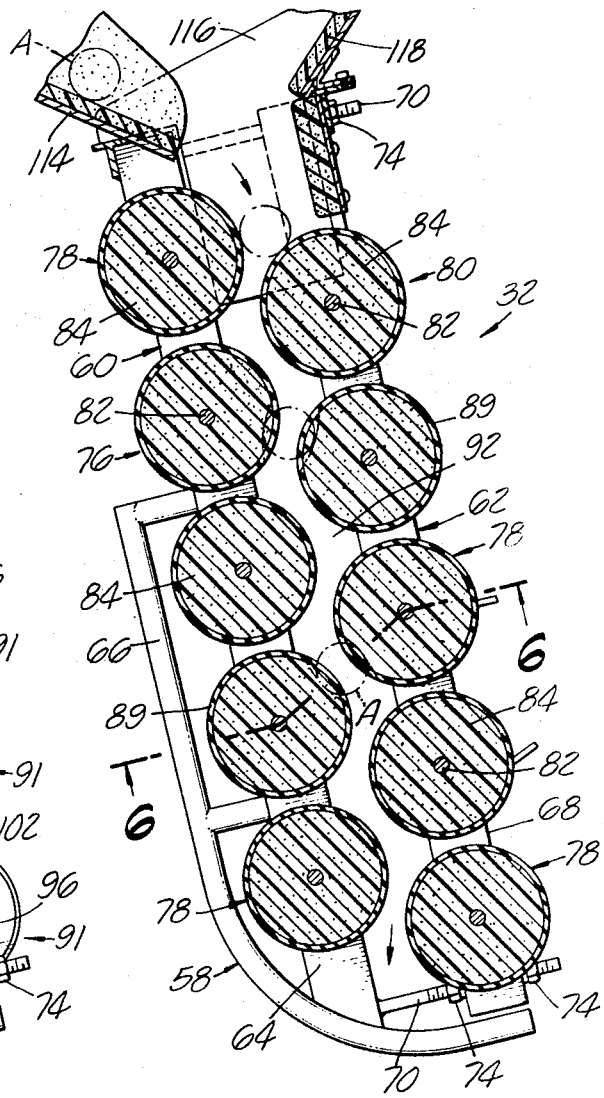
FIG. 5 is a section taken on the line 5—5 in FIG. 3.

In use of the harvesting platform 30, the latter is maneuvered to a position close to each tree containing fruit to be harvested. The fruit is then picked from the tree by pickers who stand on the upper deck means 48 of the platform and deposit the picked or harvested fruit on the upper conveyor 50. This conveyor 50 transports the fruit to the outfeed chute 114, through which the fruit rolls downwardly to the infeed end of the present transfer conveyor 32. Referring to FIGS. 4 and 5, it will be observed that the conveyor feed rollers 78 are driven in directions to feed or convey the entering fruit downwardly through the conveyor passage 92 into the lower fruit receiving bin 54. Attention is directed to the fact that the roller sets 76, 80 are relatively adjusted, by means of the adjusting screws 70, to positions wherein the spacing between the rollers of each roller pair 91 is slightly less than the minimum diameter of the fruit to be conveyed. The supporting brackets 106, 108 for the driving and idler sprockets 98, 100 are adjustable to accommodate this roller adjustment and regulate the drive chain tension after the roller adjustment. The spacing between the successive rollers of each roller set is made substantially less than this minimum diameter and, as a general rule, is somewhat less than the spacing between the rollers of the roller pairs 91, as shown. The roller pairs 91 are thus effective, in successive fashion, to feed or convey the incoming fruit, in the manner explained earlier, downwardly through the conveyor passage 92 into the fruit receiving bin 54. The spongy feed rollers 78 yield locally in the manner shown in FIG. 5 to accommodate movement of the fruit between the rollers of the roller pairs, as well as to accommodate fruit of various sizes and shapes, all without bruising or other damage to the fruit. The outer wear sleeves 89 of the feed roller 78 prevent excessive wear of the spongy roller bodies 84 without interfering with the resilient compliancy of these bodies.

As the fruit receiving bin 54 fills up, the transfer conveyor 32 is slowly elevated from the bin by the elevating means 120. When the bin is finally filled, the conveyor is raised clear of the bin, after which the bin is advanced rearwardly to the outfeed ramp 56 of the harvesting platform and then replaced by an empty bin.

Reference is now made to FIG. 7, illustrating a fruit packaging machine 34 embodying the transfer conveyor 10a according to the invention. Conveyor 10a conveys or transfers the incoming fruit to be packaged from an infeed conveyor 122 at the lower infeed level 42 of the machine to the main packaging station 124 located at the upper packaging level 44 of the machine. Transfer conveyor 10a has already been described in some detail so that no substantial further description of the conveyor is necessary, except to say that the conveyor feed rollers 18 are driven in directions to convey the incoming fruit upwardly through the conveyor passage 20. It is worthy of recall, however, that the fruit enters and emerges laterally of the transfer conveyor 10a. To this end, the lowermost roller 18a of the roller set 16 rotates counterclockwise with the other rollers rotating clockwise, and the uppermost roller 18b of the roller set 14 turns clockwise with the remaining rollers of the set turning counterclockwise. The infeed conveyor 122 delivers the incoming fruit between the two lowermost rollers of roller set 16, which then feed the fruit into the transfer conveyor passage. The two uppermost rollers of the roller set 14 discharge the fruit laterally from the transfer conveyor 10a to an infeed chute 126 leading to the upper packaging station 124 of the packaging machine 34. It will be understood that the frame 12 of the conveyor 10a is suitably supported in its illustrated upright position.

As noted earlier, and shown in FIG. 7, the infeed and outfeed motions of the fruit being conveyed occur through opposite sides of the conveyor. This adapts the conveyor to applications such as that illustrated in FIG. 7.

The conveyor of FIG. 8 is similar to that of FIG. 7 but the infeed and outfeed motions of the conveyed articles occur through the same side of the conveyor. For this purpose, upper roller 18c of roller set 14 rotates counterclockwise and a roller 18d is added to the upper end of the roller set 16 and rotates oppositely from the next lower roller to cooperate therewith to discharge the articles from the conveyor.

While the illustrated conveyors of the invention are mounted in generally upright attitudes, a present conveyor obviously may be mounted in any attitude including a generally horizontal attitude.

It is to be noted that in all instances the radial depth of the yielding foamed portions of the rollers is substantial to provide sufficient yielding action to avoid damage to delicate fruit. In the different conveyor constructions heretofore described, the radial depth of the yielding foamed material of the rollers is at least equal to the maximum diameter of the fruit, but it is to be understood that in some instances the radial depth may be less than the diameter of the fruit. The radial depth of the foamed material is shown as greater than one-half of the radius of the roller, but here again, the depth may be less in some instances.

In the form of the conveyor shown in FIGS. 3, 4, and 5 where the fruit is conveyed downwardly from an upper level to a lower level, it is to be noted that the path of conveyance defined for the levels is characterized by alternate narrow portions and broad portions, the narrow portions being where a piece of fruit passes between two cooperating rollers. The arrangement of the rollers may be such that all the broad portions of the path are less than the diameter of the fruit so that the fruit is always snugly confined by the yielding peripheral surfaces of the rollers. Since the fruit tends to gravitate downwardly along the conveyor path, however, it is not necessary that the fruit be continuously closely captivated. In other words, the arrangement shown in cross section in FIG. 5 may be such that at least some of the smaller fruit fall freely from one pair of rollers to the next pair of rollers. Thus, the downward progress of the fruit would be characterized by short free drops from one pair of rollers to the next pair of rollers with each drop cushioned by the yielding material of the rollers. Thus, a piece of fruit would be alternately gripped by a pair of rollers and released to gravitate freely into gripping engagement by the next succeeding pair of rollers.

The embodiment of the conveyor shown in FIG. 9 is closely similar to the embodiment shown in FIG. 7. One improvement incorporated in the conveyor shown in FIG. 9 is the employment of a feed belt 132 which encompasses both the lowermost roller 18a and an idler roller 134. The belt provides an upper run onto which fruit may be delivered by a feed chute 136.

Another optional improvement incorporated in FIG. 9 is the provision of a flexible belt 138 encompassing rollers of the roller set 14a and a similar belt 140 encompassing rollers of the roller set 16a. The three belts 132, 138, and 140 are made of highly flexible thin sheet material. The various belts readily yield to permit the various pairs of rollers to function in the yielding manner heretofore described. The two belts 138 and 140 have inner runs between the roller sets 14a and 16a which inner runs yieldingly confine the fruit and greatly facilitate the upward progress of the fruit.

Preferably, the two endless belts 138 and 140 are of excess length to provide a desirable degree of slack with the slack taken up by yieldably mounted idler rolls. Thus, in FIG. 9 the belt 138 passes around an idler roller 138a that is mounted on a swingable arm 138b with a spring 138c acting on the arm to yieldingly take up slack in the belt. In like manner, the belt 140 passes around an idler roller 140a on an arm 140b that is acted upon by a spring 140c. The two idler rollers 138a and 140a yield as required for the two belts to accommodate themselves to the objects that are moved along the path of conveyance.

FIGS. 10, 11, and 12 shown diagrammatically how a conveyor of the present type may be combined with heater means and blower means to serve the purpose of drying wet articles, for example, pieces of fruit, as they issue from a washing operation.

In FIG. 10 a conveyor belt 142 which receives wet fruit from a washing operation discharges the fruit onto a ramp 144 which in turn deposits the fruit on a feed belt 145 that interconnects two resiliently compliant feed rollers 146 and 148. The feed roller 148 rotates clockwise as indicated and is the bottommost roller of a first row of rollers. The remaining rollers 150 of the first row rotate counterclockwise. The first row of rollers cooperates with a second row of rollers 152 to form an upward conveyor passage and for this purpose all of the rollers of the second row except the topmost roller 154 rotate clockwise, the topmost roller rotating counterclockwise. A third row of rollers 155 rotate counterclockwise to cooperate with the second row to form a downward conveyor passage that leads to a ramp 156 which in turn leads to a conveyor belt 158 for discharging the fruit from the dryer.

As indicated by dotted arrows, fruit delivered to the conveyor belt 145 is carried upwardly between the first two rows of rollers and the uppermost roller 154 of the second row cooperates with the next lower roller to transfer the fruit to the downward passage formed by the second and third rows.

Any suitable heater means and blower means may be combined with such a roller arrangement for the purpose of drying the wet fruit. FIG. 10 shows diagrammatically heating element means 160 and an associated blower means 162.

It is well known that the rate at which a given amount of water is evaporated in a given time interval by means of a heated air stream depends upon the total area of the water that is exposed to the air stream. An important advantage of a dryer constructed as indicated in FIG. 10 is that the moisture adhering to the moving washed fruit is continuously transferred to the surfaces of the compliant conveyor rollers so that substantial portions of the areas of the conveyor rollers in addition to the surfaces of the fruit are subjected to evaporation by the warm air stream. As a consequence, the fruit passing through the conveyor is dried at a substantially higher rate than would be possible if the fruit were exposed for the same period of time without contact with the cooperating conveyor rollers. It is to be further noted that the drying efficiency is increased by the movement of the peripheral surfaces of the rotating fruit relative to the ambient atmosphere, as well as by rotation of the surfaces of the rollers relative to the ambient atmosphere.

In FIG. 10 the second row of rollers functions on one side to cooperate with the first row to lift fruit and on the other side to cooperate with the third row to lower fruit. Thus, in FIG. 10 each of the rollers 152 of the second row receives moisture from the fruit simultaneously in regions on opposite sides of the roller. In some installations it is desirable to add a fourth row of rollers so that only one side of each row of rollers will make contact with the wet fruit. For this purpose the arrangement of conveyor rollers shown in FIG. 11 may be used.

In FIG. 11 a conveyor belt 164 cooperates with a ramp 165 to deliver the wet fruit to a feed belt 166 that interconnects the clockwise rotating compliant feed rollers 168 and 170. The feed roller 170 is the lowermost feed roller of a first row of feed rollers and the remaining compliant rollers 172 of the first row rotate counterclockwise. In the second row of rollers the uppermost roller 170 rotates counterclockwise and the remaining rollers 174 rotate clockwise. The uppermost compliant roller 175 of the third row rotates counterclockwise and the remaining rollers 176 of the third row rotate clockwise. The rollers 176 of a fourth row all rotate counterclockwise.

As indicated by dotted arrows, the fruit delivered to the feed belt 166 travels upwardly along a conveyor passage formed by the first two rows of rollers and at the upper end of this conveyor passage the roller 170 of the second row cooperates with the next adjacent lower roller to transfer the fruit to the region between the uppermost roller 175 of the third row and the next adjacent roller. The latter two rollers transfer the fruit to the downward conveyor path formed by the third and fourth rows of rollers and the dried fruit is delivered to a ramp 178 leading to a discharge conveyor 180.

The described fruit dryers illustrated by FIGS. 10 and 11 illustrate the fact that a system of the compliant rollers may not only provide a conveyor path in a given direction but may also provide a conveyor path that changes in direction and may easily make a change of direction of 180°. In FIGS. 10 and 11 the change in direction is from vertically upward to vertically downward, but the change may also be from vertically downward to vertically upward. It is apparent that if the fruit issues from a washing zone at a relatively high rate of travel and then travels through a drying zone at the same rate of travel, the period of time in which the travelling fruit is exposed to the drying operation may be extended as much as desired by simply repeatedly reversing the direction of travel of the fruit in a relatively compact dryer space. FIG. 12, for example, shows how the path of the fruit to be dried may be reversed from upward travel to downward travel and then may again be reversed from downward travel to upward travel.

In FIG. 12 a conveyor belt 182 and a cooperating ramp 184 deliver the fruit to a feed belt 185 on two feed rollers 186 and 188. The feed roller 188 which rotates clockwise is the lowermost roller of a first row of rollers and the remaining rollers 190 of the first row rotate counterclockwise. A roller 192 at the top of the second row also rotates counterclockwise but the remaining rollers 194 of the second row rotate clockwise. The lowermost roller 195 of the third row rotates clockwise but the remaining rollers 196 of the third row rotate counterclockwise. The uppermost roller 202 of the fourth row rotates counterclockwise but the remaining rollers 204 of the fourth row rotate clockwise.

As indicated by dotted arrows, the fruit is carried upwardly along a conveyor path between the first two rows of rollers and then the upper roller 192 cooperates with the next adjacent lower roller to transfer the fruit to a downward passage that is formed by the second and third rows. At the lower end of the downward passage the roller 195 cooperates with the next higher roller 196 to transfer the fruit to a third upward passage between the third and fourth rows of rollers. At the upper end of this last passage the roller 202 cooperates with the next adjacent lower roller 204 to deliver the dried fruit to a ramp 205 that leads to a discharge conveyor belt 206.

In summary it may be noted that in all instances where a conveyor transports articles in a given general direction, two rows of resiliently compliant rollers extending in the given general direction are positioned opposite each other with the two rows staggered relative to each other to form a serpentine path that alternately changes direction to follow the peripheral surfaces of the rollers on opposite sides of the path with successive pairs of the rollers positioned diagonally of said general direction and spaced apart by less than the cross dimension of the articles to cooperate to convey the articles along the serpentine path, rollers of one row being thus paired with two rollers of the other row to convey the articles along two successive portions of the serpentine path. It is to be noted that the articles are supported along the serpentine path and are moved along the serpentine path solely by means of the opposed pressures exerted by the two rows of rollers.

It will be readily appreciated by those skilled in the art that resiliently compliant rollers for the purpose of the invention may be constructed in various ways of various materials. For example, FIG. 13 shows how rollers in the various conveyors heretofore described may be inflated rollers. In FIG. 13 each roller 208 is mounted on a corresponding tubular shaft 210 which is supported at its opposite ends by bearings 212 on frame members 214. Each of the rollers 208 may have rigid end walls 215 which are joined in a sealed manner to the opposite ends of thin walled cylinders 216 of suitable material having the desired capability for resilient deformation.

One end of each hollow shaft 210 is connected by a corresponding rotary joint 218 to a pipe system generally designated 220 which supplies gaseous fluid, for example, compressed air, at a desired pressure. A suitable compressor (not shown) is connected to an adjustable pressure reducer 222 which is connected to the pipe system 220 by a manifold 224, the manifold being provided with a suitable pressure gage 225.

By means of the pressure reducer 222 the pipe system 220 may be supplied with compressed air at any desired pressure and it is a simple matter to manipulate the pressure reducer with the guidance of the gage to vary the pressure level in the pipe system. If the fruit to be conveyed is relatively hard, for example, if the fruit is citrus fruit, the pressure in the pipe system may be moderately high. On the other hand, if the fruit is of a more fragile type, the pressure may be reduced.

While specific structural details have been shown and described, it should be understood that changes and alterations may be resorted to without departing from the spirit of the invention as defined in the appended claims.

We claim:

1. In a conveyor for transporting articles of generally circular cross-sectional configuration such as fruit of a given range of diameters in a given general direction from an input zone to an output zone, the combination of:
   two rows of resiliently compliant power actuated rollers with their axes extending transversely of gravitational force and with the two rows extending in the given general direction and positioned opposite each other with the two rows staggered relative to each other to form an upwardly directed serpentine path for the articles that alternately changes direction to follow the peripheral surfaces of rollers on opposite sides of the path, the direction of rotation of the rollers of each of the two rows being opposite to the direction of rotation of the rollers of the other row with all the peripheral surfaces of the rollers adjacent said path travelling in the given general direction, means for driving said rollers at substantially the same peripheral speed, the successive pairs of the rollers being positioned oppositely diagonally of said general direction to cause the travelling articles to alternately change direction as required to follow the serpentine path, said rollers being of substantially larger diameter than the maximum diameter in said range of diameters and the rollers having continuous outer circumferential surfaces sufficiently resiliently radially yieldable to accommodate articles of maximum diameter within said range of diameters.

2. A conveyor as set forth in claim 1 in which the outer radial portions of the rollers are made of foamed elastomeric material with the radial depth of the foamed material at least as great as the average cross dimension of the objects.

3. A conveyor as set forth in claim 2 in which the depth of the foamed elastomeric material is at least equal to one-half of the radius of the rollers.

4. A conveyor as set forth in claim 1 which includes two sets of rollers arranged in rows on opposite sides respectively of said path; and which includes flexible belt means encompassing rollers of at least one of the two sets for contact with the objects.

5. A conveyor as set forth in claim 4 which includes a yieldingly mounted idler roller to take up slack in said belt means.

6. A conveyor as set forth in claim 1 which includes two flexible belt means on the opposite sides respectively of said path;
   each of the belt means being interposed between the objects and the rollers on the corresponding side of the path;
   each of said belt means travelling in the direction of conveyance of the contiguous rollers.

7. A conveyor according to claim 1 wherein:

each of said rollers comprises a body of closed cell foamed plastic.

8. A conveyor as set forth in claim 1 for conveying objects through a processing zone, the resiliently compliant conveyor rollers being arranged in multiple rows to form a path of conveyance that changes in direction to provide a relatively long path in a relatively compact space.

9. A conveyor as set forth in claim 8 in which the rows are arranged to form a conveyor path that doubles back on itself at least once.

10. A conveyor as set forth in claim 1 in which said rollers are arranged for change in direction of the path of conveyance.

11. A conveyor as set forth in claim 1 in which at least some of the resiliently compliant rollers are inflated.

12. A conveyor as set forth in claim 11 which includes a source of compressed gaseous fluid connected to the inflated rollers to supply compressed gaseous fluid thereto.

13. A conveyor as set forth in claim 12 which includes adjustable means to vary the pressure of the compressed gaseous fluid in the inflated rollers.

14. In combination with a fruit harvesting platform having an upper harvesting level and a lower loading level, a conveyor for transporting harvested fruit from said upper level to said lower level comprising:

a generally upright support means extending between said levels, first and second roller sets supported on said support means with said roller sets spaced to define an intervening passage, each said roller set including a number of resiliently compliant feed rollers arranged along said passage in such manner that each roller of each roller set and at least one roller of the opposing roller set are disposed in confronting relation to define a pair of opposed coacting rollers, the spacing between the confronting surfaces of the rollers of the several roller pairs being less than the diameters of the smallest fruit to be conveyed, and drive means for driving at least one roller of each roller pair in such a way that the inner side of each driven roller adjacent said passage travels in the downward direction relative to said passage.

15. In combination with a fruit packaging machine having a lower infeed level, an upper packaging level, an infeed conveyor at said lower level, and a packaging station at said upper level, a conveyor for transporting fruit from said lower level to said upper level comprising:

a generally upright support means extending between said levels, first and second roller sets supported on said support means with said roller sets spaced to define an intervening passage, each said roller set including a number of resiliently compliant feed rollers arranged along said passage in such manner than each roller of each roller set and at least one roller of the opposing roller set are disposed in confronting relation to define a pair of opposed coacting rollers, the spacing between the confronting surfaces of the rollers of the several roller pairs being less than the diameters of the smallest fruit to be conveyed, and drive means for driving at least one roller of each roller pair in such a way that the inner side of each driven roller adjacent said passage travels in the upward direction relative to said passage.

16. A conveyor as set forth in claim 1 in which an additional roller in said output zone is positioned adjacent an end roller of one of the two rows of rollers, the additional roller rotating oppositely from the rollers in said one row to cooperate with the adjacent end roller of the row to move the articles out of the conveyor laterally of said given direction.

17. A conveyor as set forth in claim 1 in which a belt to feed objects to the conveyor encompasses an end roller of one of the two rows of rollers in said input zone to feed the articles to the conveyor.

18. A conveyor as set forth in claim 1 in which an additional roller in said input zone is adjacent an end roller of one of said two rows of rollers and rotates oppositely from the direction of rotation of the rollers of said one row to cooperate with the adjacent end roller of the row to feed the articles to the conveyor.

* * * * *